United States Patent
Gilmer

(10) Patent No.: US 10,941,509 B2
(45) Date of Patent: Mar. 9, 2021

(54) PATCH AND METHOD OF MANUFACTURE

(71) Applicant: Custom Chenille Embroidery, Inc., Dallas, TX (US)

(72) Inventor: Ronald Lee Gilmer, Rowlett, TX (US)

(73) Assignee: Custom Chenille Embroidery, Inc., Dallas, TX (US)

( * ) Notice: Subject to any disclaimer, the term of this patent is extended or adjusted under 35 U.S.C. 154(b) by 0 days.

(21) Appl. No.: 15/912,229

(22) Filed: Mar. 5, 2018

(65) Prior Publication Data

US 2018/0258570 A1 Sep. 13, 2018

Related U.S. Application Data

(60) Provisional application No. 62/468,753, filed on Mar. 8, 2017.

(51) Int. Cl.
| | |
|---|---|
| *D05C 17/02* | (2006.01) |
| *A41D 27/08* | (2006.01) |
| *B32B 5/02* | (2006.01) |
| *B32B 7/08* | (2019.01) |
| *D05C 17/00* | (2006.01) |
| *D02G 3/42* | (2006.01) |

(52) U.S. Cl.
CPC .......... *D05C 17/023* (2013.01); *A41D 27/08* (2013.01); *B32B 5/022* (2013.01); *B32B 7/08* (2013.01); *D05C 17/00* (2013.01); *B32B 2305/20* (2013.01); *B32B 2556/00* (2013.01); *D02G 3/42* (2013.01); *D05D 2209/00* (2013.01)

(58) Field of Classification Search
CPC .......... D05C 17/023; A41D 27/08; D02G 3/42
See application file for complete search history.

(56) References Cited

U.S. PATENT DOCUMENTS

| | | | | | |
|---|---|---|---|---|---|
| 1,741,620 | A | * | 12/1929 | Fixler | D04B 33/00 112/405 |
| 5,005,219 | A | * | 4/1991 | Diaz | A41D 27/08 112/400 |
| 6,718,895 | B1 | * | 4/2004 | Fortuna | D05B 19/08 112/475.19 |
| 6,860,214 | B1 | * | 3/2005 | Wang | D05C 15/00 112/475.22 |
| 6,994,044 | B2 | * | 2/2006 | Kwon | D05C 17/00 112/439 |
| 2005/0103248 | A1 | * | 5/2005 | Kwon | D05C 17/00 112/475.18 |
| 2006/0143791 | A1 | * | 7/2006 | Kronenberger | A42B 1/248 2/195.1 |
| 2019/0104786 | A1 | * | 4/2019 | Fagan | B32B 7/12 |

* cited by examiner

*Primary Examiner* — Tajash D Patel
(74) *Attorney, Agent, or Firm* — Ferguson Braswell Fraser Kubasta PC

(57) ABSTRACT

A patch comprising a lower layer of felt material, and an inner area stitched to the felt and having a desired shape. A first stitched border surrounds the central area, and a second stitched border surrounds the first border.

8 Claims, 5 Drawing Sheets

PATCH AND METHOD OF MANUFACTURE

CROSS-REFERENCE TO RELATED APPLICATION

This application claims the benefit of priority from U.S. Provisional Patent Application No. 62/468,753 filed on Mar. 8, 2017, which is incorporated herein by reference.

TECHNICAL FIELD

The present invention relates to an improved method of manufacturing patches for letter jackets and the like and to improved patches for letter jackets and the like.

BACKGROUND

The current common form of patch for letter jackets consists of one of more layers of felt, frequently of contrasting color, and stitching of chenille yarn.

FIGS. 2 and 4 show examples of prior art patches. In FIGS. 2 and 4, the dotted fill pattern represents the felt portions and the weaved fill pattern represents the Chenille portions. The prior art patch shown in FIG. 2 comprises a lower layer 11 of white felt and an upper layer 13 of green felt held together by stitching 15 of white chenille yarn. The stitching 15 defines an inner area 16 which is filled in with green chenille yarn 17.

The prior art patch shown in FIG. 4 has a similar construction to the patch shown in FIG. 2, but the upper felt layer 13 is blue and the chenille yarn 17 filling the area 16 is gold.

The construction used for the patches of FIGS. 2 and 4 has several disadvantages. First, the edges of the felt 13 outside the stitching 15 are not secured to the felt 11 and tend to curl apart from the felt 11. Second, the upper felt layer 13 must be cut manually, which results in inaccuracy in the match between the shape of the felt 13 and the chenille yarn stitching 15.

In addition, in the patch shown in FIG. 2, it is hard to achieve a good color match between the felt 13 and the main chenille fill 17, because one is felt and the other chenille yarn and the appearances and color match between the two types of material will not be exact.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The improvement of embodiments of the present invention includes replacing the upper layer 13 of felt with an outer border formed of thread. In at least some embodiments, using thread in place of the upper felt layer 13 avoids the curl problem because the thread is stitched to the lower felt 11. In at least some embodiments, it also obviates the need for manual cutting of an upper layer of felt and allows an exact color match with the main area 17 when that is desired.

Figure 1:
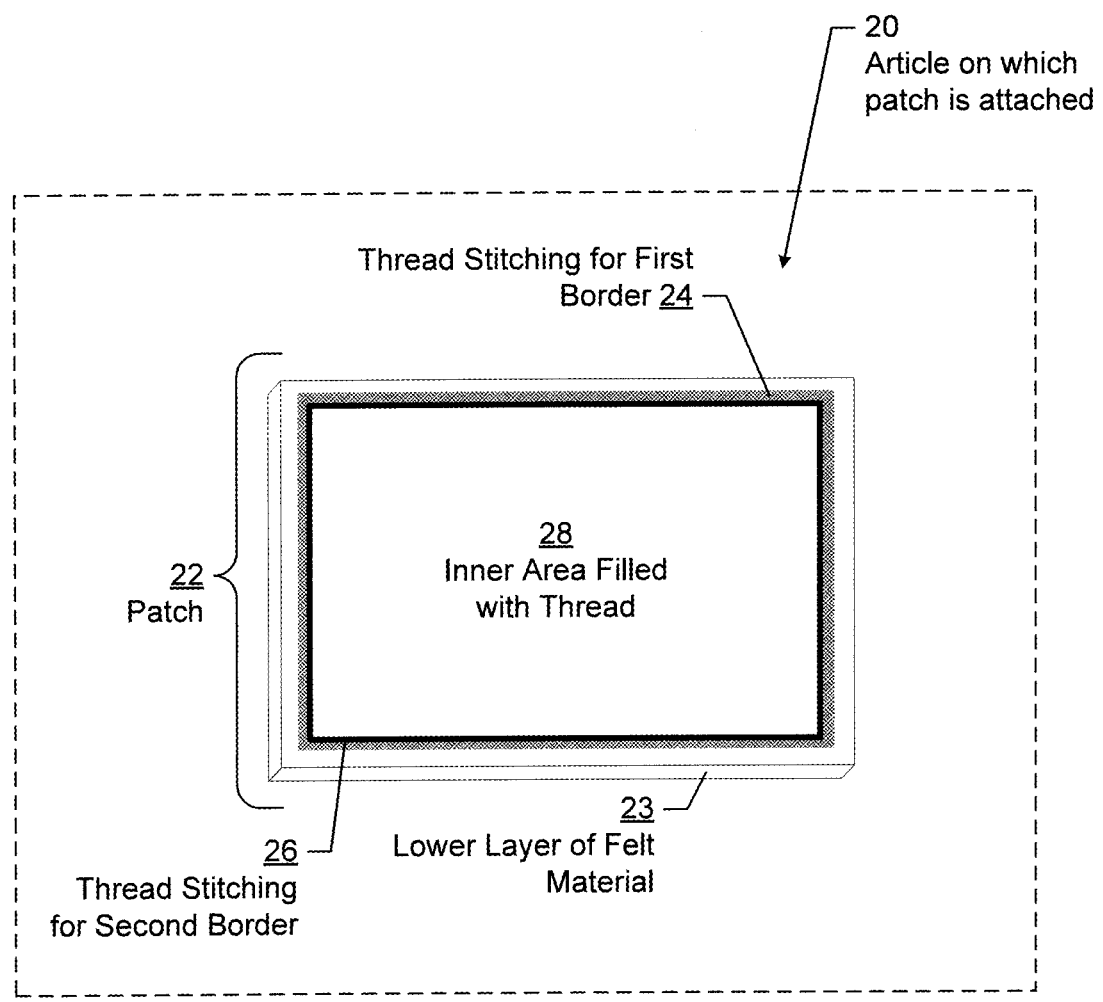
FIG. 1 shows a schematic diagram according to one or more embodiments of the invention.
Figure 2:
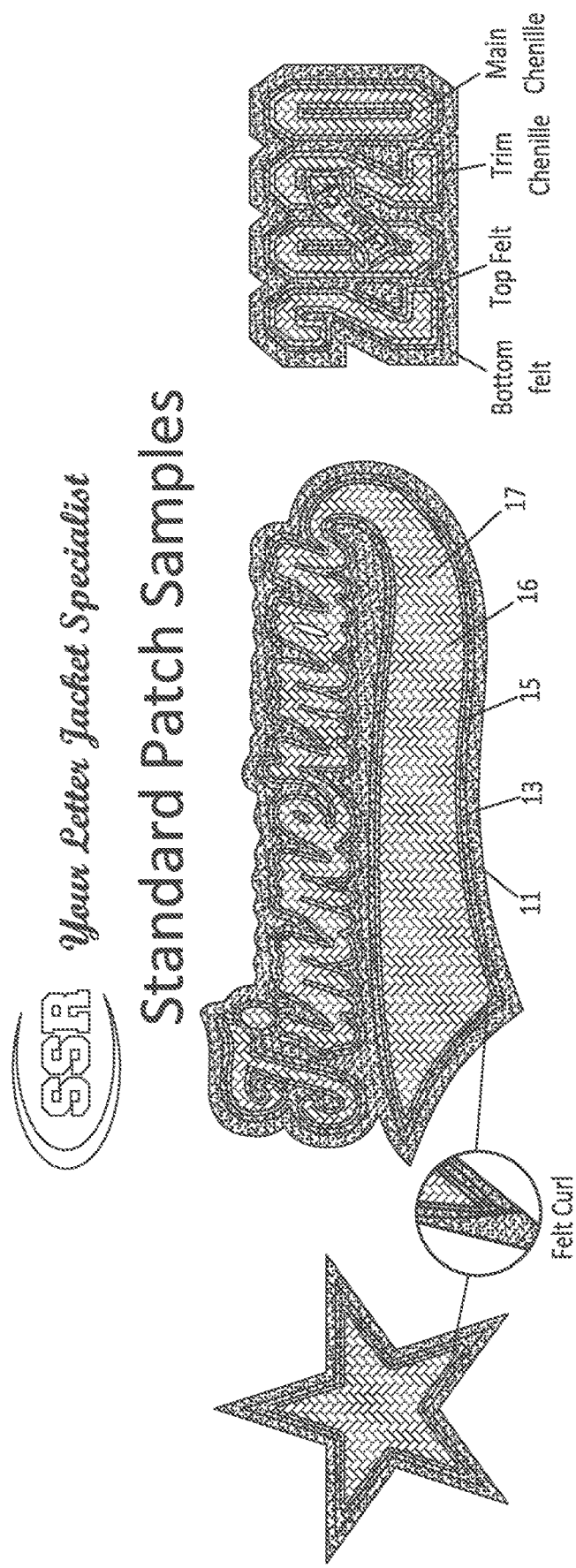
FIG. 2 shows a prior art letter jacket patch having the current common construction described above.

FIG. 1 shows a schematic diagram according to one or more embodiments of the invention. Specifically, FIG. 1 shows an example schematic diagram of a patch 22. Although the patch 22 and stitching is shown as a rectangular shape in FIG. 1, the patch 22 and stitching may be any defined shape. As shown in FIG. 1, the patch includes a lower layer of felt material 23. The lower layer 23 is a base layer that is intended to be next to or affixed to the article on which the patch may be attached 20. As described below, the lower layer is made of felt material and may be of virtually any color. Thread is stitched on the lower layer to create a first border 24, shown as a pattern fill in FIG. 1. The thread may be yarn in at least some embodiments. Further, the thread may be chenille yarn. The first boarder may be the same shape and different size as the felt material. The first border may be designated as an outer border. Additionally, thread may be stitched on the lower layer to form a second border 26, shown as a black thick line in FIG. 1. The second border may be a same or different color than the lower layer of felt 23. The second boarder may be the same shape as the first boarder. Alternatively, the second boarder may be a different shape. Within the second boarder 26 is an inner area filled with thread 28. The inner area is designated as the white interior of the square in FIG. 1. In some embodiments, the felt material and the second boarder are the same color. In some embodiments, the inner area and the first boarder are the same color. Various color embodiments may be used without departing from the scope of the claims.

Figure 3:
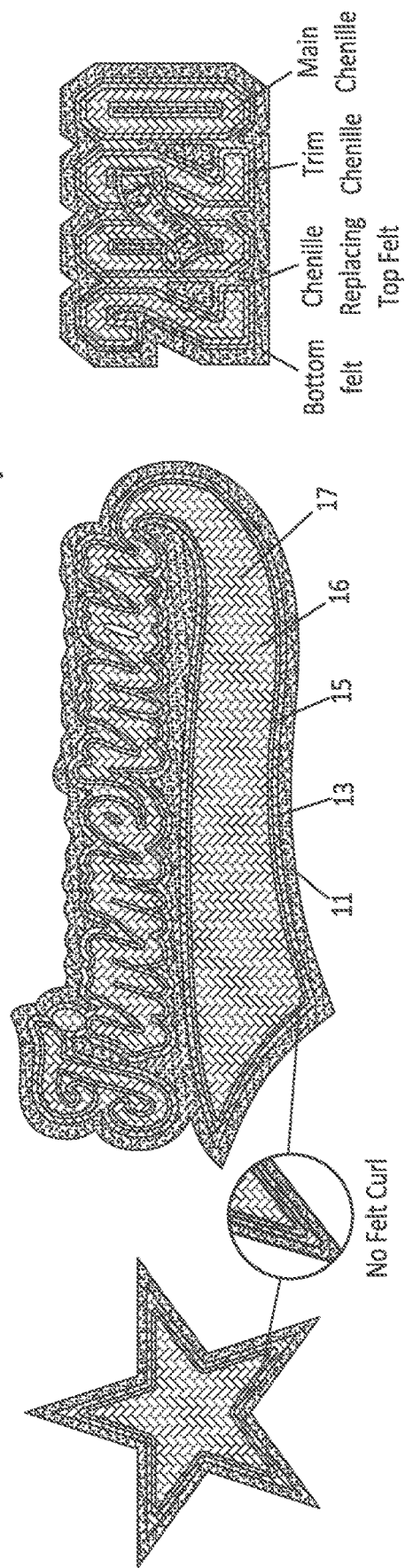
FIG. 3 shows an example of a letter jacket patch embodying the present invention.
Figure 4:
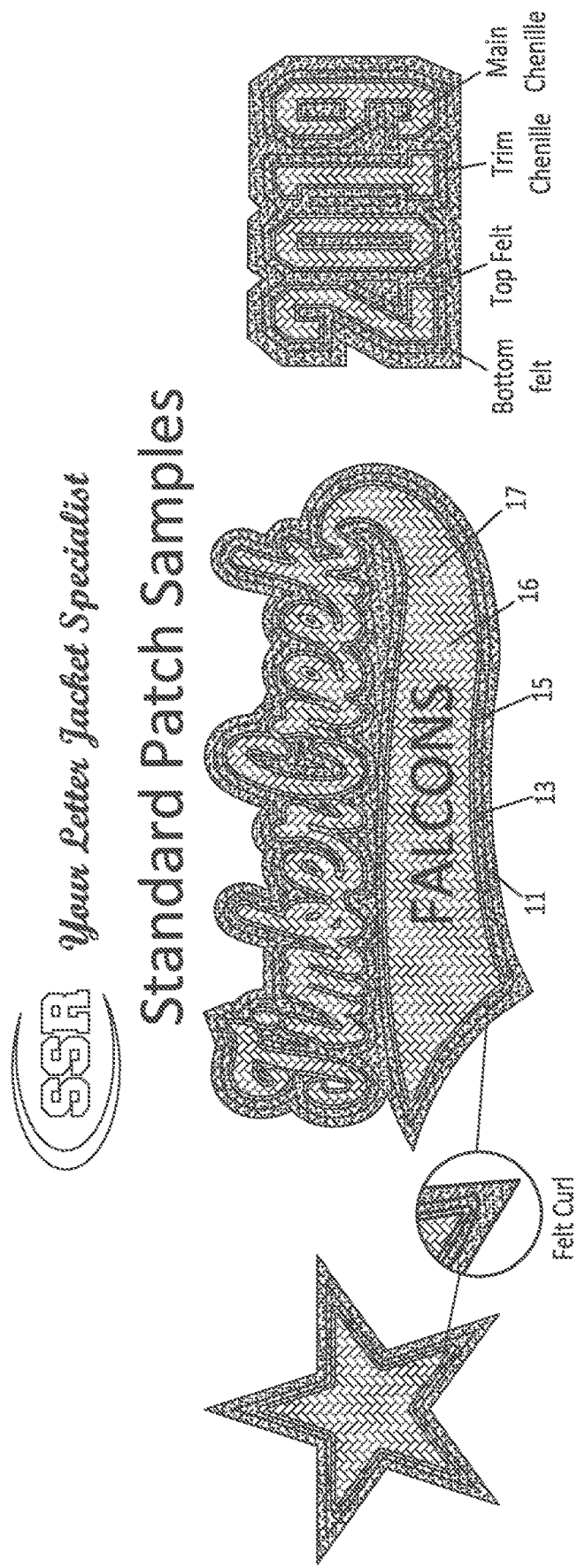
FIG. 4 shows a second prior art letter jacket patch having the current common construction described above.
Figure 5:
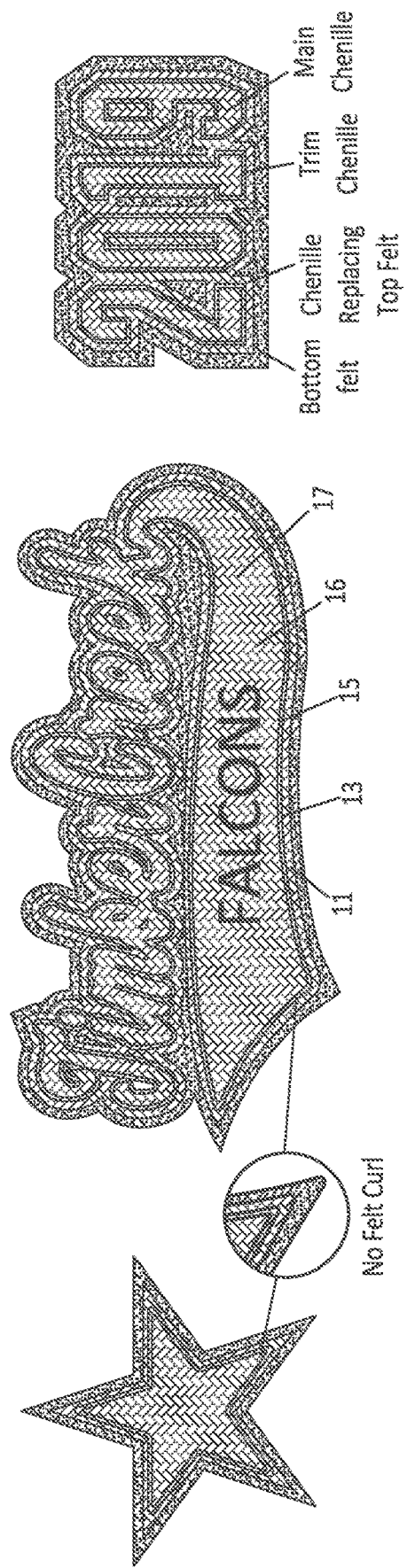
FIG. 5 shows an example of a second letter jacket patch embodying the present invention.

In FIGS. 3 and 5, the dotted fill pattern represents the felt portions and the weaved fill pattern represents the Chenille portions. The patch of FIG. 3 is manufactured as follows: a lower layer of, for example, white felt 11 is procured. Thread 17 is stitched through the felt 11, using a moss stich, to fill an area 16 of defined shape in the interior of the felt 11 using a stitching machine, preferably a computer numerical control machine. In the example shown in FIG. 3, the thread 17 is chenille yarn. The thread 17 in this example is green.

An outer border 13 is stitched with a chain stitch using the same thread as is used to fill the area 16. An inner border 15 of thread is chain stitched using the computer numerical control machine. In this example, the inner border 15 is formed using a chenille thread that contrasts in color with that used to fill the area 16.

Finally, the felt 11 is cut to the required shape.

After this step, a backing cover (not shown) of fusible backing is attached to the rear side of the felt 11 by heat and pressure.

The patch shown in FIG. 5 is constructed in the same way as the patch shown in FIG. 3. In this example, however, the thread used to fill the area 16 and the thread used to create the outer border 13 are of contrasting colors.

It will be appreciated that although felt and thread are the typical materials used for letter jacket patches, other materials, such as wool and thread, could be used.

Moreover, although the patch described above is a patch for a letter jacket, other patches can be manufactured using the method.

The invention claimed is:

1. A method of manufacturing a patch including the steps of:

providing a lower layer of felt material;

filling an inner area of the felt material of a first defined shape with first thread stitched through the felt material;

stitching second thread through the felt material to form a first border of a second defined shape surrounding the inner area; and stitching third thread through the felt material to form a second border of a third defined shape within the first border, the second border surrounding the inner area and disposed between the first border and the inner area.

2. The method according to claim 1, wherein the first thread used to fill the inner area is the same as the second thread used to form the first border.

3. The method according to claim 1, wherein the felt material and the second border are the same color.

4. The method according to claim 1, wherein the first thread is chenille yarn.

5. The method according to claim 1, wherein the second defined shape is the same as the third defined shape.

6. A patch comprising:
   a layer of felt material, a central area of first yarn stitched through the felt and defining an inner area of the felt material of a first defined shape;
   a first border of second yarn stitched through the felt material and surrounding the central area; and
   a second border of third yarn stitched through the felt material, the second border surrounding the first border, wherein the first border is disposed between the second border and the central area.

7. The patch according to claim 6, wherein the first yarn is chenille yarn.

8. The patch according to claim 6, wherein the first yarn used for the central area is the same as the third yarn used for the second border.

* * * * *